US011057301B2

(12) United States Patent
Thubert et al.

(10) Patent No.: US 11,057,301 B2
(45) Date of Patent: Jul. 6, 2021

(54) USING A MIDLAY IN A SOFTWARE DEFINED NETWORKING (SDN) FABRIC FOR ADJUSTABLE SEGMENTATION AND SLICING

(71) Applicant: Cisco Technology, Inc., San Jose, CA (US)

(72) Inventors: Pascal Thubert, Roquefort les Pins (FR); Jean-Philippe Vasseur, Saint Martin d'uriage (FR); Eric Levy-Abegnoli, Valbonne (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 92 days.

(21) Appl. No.: 16/360,101

(22) Filed: Mar. 21, 2019

(65) Prior Publication Data
US 2020/0304406 A1 Sep. 24, 2020

(51) Int. Cl.
*H04L 12/715* (2013.01)
*H04L 12/46* (2006.01)
*H04L 12/753* (2013.01)
*H04L 12/723* (2013.01)

(52) U.S. Cl.
CPC .......... *H04L 45/64* (2013.01); *H04L 12/4645* (2013.01); *H04L 45/48* (2013.01); *H04L 45/50* (2013.01)

(58) Field of Classification Search
CPC ...... H04L 12/4645; H04L 12/48; H04L 45/50

USPC ......................................................... 709/223
See application file for complete search history.

(56) References Cited

U.S. PATENT DOCUMENTS

| 2015/0131989 A1* | 5/2015 | Syed ................. H04Q 11/0066 398/45 |
| 2016/0380886 A1* | 12/2016 | Blair ....................... H04L 45/50 398/49 |
| 2019/0037409 A1* | 1/2019 | Wang ..................... H04W 16/04 |
| 2019/0190815 A1* | 6/2019 | Thubert .................. H04L 45/08 |

FOREIGN PATENT DOCUMENTS

WO    WO2018/121864 A1    7/2018

OTHER PUBLICATIONS

Huawei, Qiang, et al., Technology Independent Information Model for Network Slicing; draft-qiang-coms-netslicing-informatoin-model-02.txt, Internet Engineering Task Force, Jan. 26, 2018, pp. 1-28, Standardworkingdraft.

(Continued)

*Primary Examiner* — Sibte H Bukhari
(74) *Attorney, Agent, or Firm* — Behmke Innovation Group LLC; Kenneth J. Heywood; Jonathon P. Western

(57) ABSTRACT

In one embodiment, a device configures a plurality of subinterfaces for each of a plurality of physical ports of a software defined network (SDN). The device allocates a fixed amount of bandwidth to each of the subinterfaces. The device forms a plurality of midlays for the SDN by assigning subsets of the plurality of subinterfaces to each of the midlays. The device assigns a network slice to one or more of the midlays, based on a bandwidth requirement of the network slice.

18 Claims, 17 Drawing Sheets

(56) References Cited

OTHER PUBLICATIONS

International Search Report dated May 25, 2020 in connection with PCT Application No. PCT/US2020/022542.
U.S. Appl. No. 16/172,677, filed Oct. 26, 2018, Unpublished, Thurbert et al.
"Cisco Virtualized Multi-Tenant Data Center, Version 2.0, Compact Pod Design Guide", Oct. 2010, 94 pages, Cisco Sysems, Inc.
Leiserson, Charles E., "Fat-Trees: Universal Networks for Hardware-Efficient Supercomputing", IEEE Transactions on Computers (vol. C-34 , Issue: 10); pp. 892-901, Oct. 1985, IEEE.
Yuan, Xin, "On Nonblocking Folded-Clos Networks in Computer Communication Environments", 2011 IEEE International Parallel & Distributed Processing Symposium, May 2011, pp. 188-196, IEEE, Anchorage, Alaska.
Carlton, Alan, "What is the Difference Between Network Slicing and Quality of Service?", Oct. 2017, 7 pages, Computerworld.
Jain, Shivlu, "Network Slicing in 5G | MPLSVPN—Moving Towards SDN and NFV BAsed Networks", online blog: http://www.mplsvpn.info/2018/04/network-slicing-in-5g.html, Apr. 7, 2018, printed Feb. 28, 2019, 3 pages, MPLSVPN.Info.
Odhah, Najib, "Is Network Slicing as Network Function Virtualization (NFV) or Not?", online https://www.researchgate.net/post/Is_network_slicing_as_Network_Function_Virtualization_NFV_or_not, Mar. 3, 2018, printed Feb. 28, 2019, 5 pages, ResearchGate.

* cited by examiner

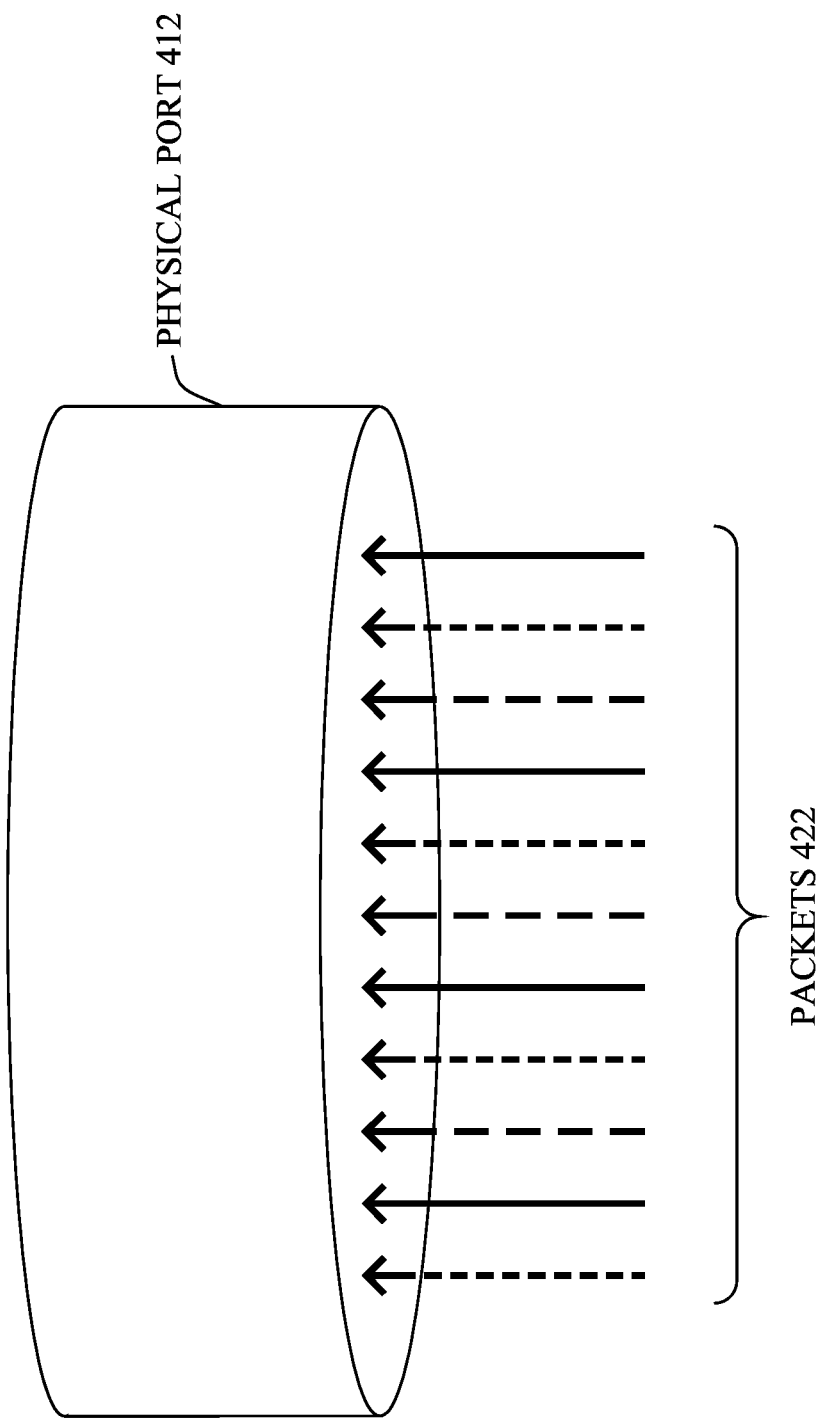

USING A MIDLAY IN A SOFTWARE DEFINED NETWORKING (SDN) FABRIC FOR ADJUSTABLE SEGMENTATION AND SLICING

TECHNICAL FIELD

The present disclosure relates generally to computer networks, and, more particularly, to using a midlay in a software defined networking (SDN) fabric for adjustable segmentation and slicing.

BACKGROUND

Software defined networking (SDN) represents an evolution of computer networks away from a decentralized architecture to one of centralized, software-based control. More specifically, in traditional computer networks, the control plane (e.g., selection of the routing path) and the data plane (e.g., forwarding packets along the selected path) are intertwined, with control plane decisions being made in a decentralized manner via signaling between the networking devices. In contrast, control plane decisions in an SDN-based network architecture are made by a centralized controller and pushed to the networking devices, as needed.

While applicable to any number of different types of network deployments, SDN is particularly of relevance to cloud service provider networks. Indeed, in a traditional client-server architecture, the network need only support traffic between the client and the server. However, with cloud computing, each transaction with a client may result in a large amount of "east-west" traffic between nodes in the cloud (e.g., to perform a query or computation in parallel, etc.), as well as the traditional "north-south" traffic between the cloud and the client. In addition, the very nature of cloud computing environments allows for the rapid scaling of resources with demand, such as by spinning new nodes up or down. In such situations, centralized control over the control plane results in better network performance over that of decentralized control.

With a 5G cellular network, the core of the network takes on a sliced, flat structure, and the data centers that serve it must align with this model. A typical SDN implementation allows for dedicating cores to various slices in the servers, but the network is a shared, flat CLOS/Fat-Tree model where incast and drops due to one slice overheating will affect the others. Overlays enable end-to-end communications, and it is possible to build more than one overlay to serve different slices. However, it is not currently possible to associate physical resources to the overlays, since routing is decided in the underlay. In order to really fit the slicing model, each overlay would need its own underlay with its own slice of the physical resources.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4D illustrates examples of using subinterfaces in an SDN.

DESCRIPTION OF EXAMPLE EMBODIMENTS

Overview

Figure 1A:
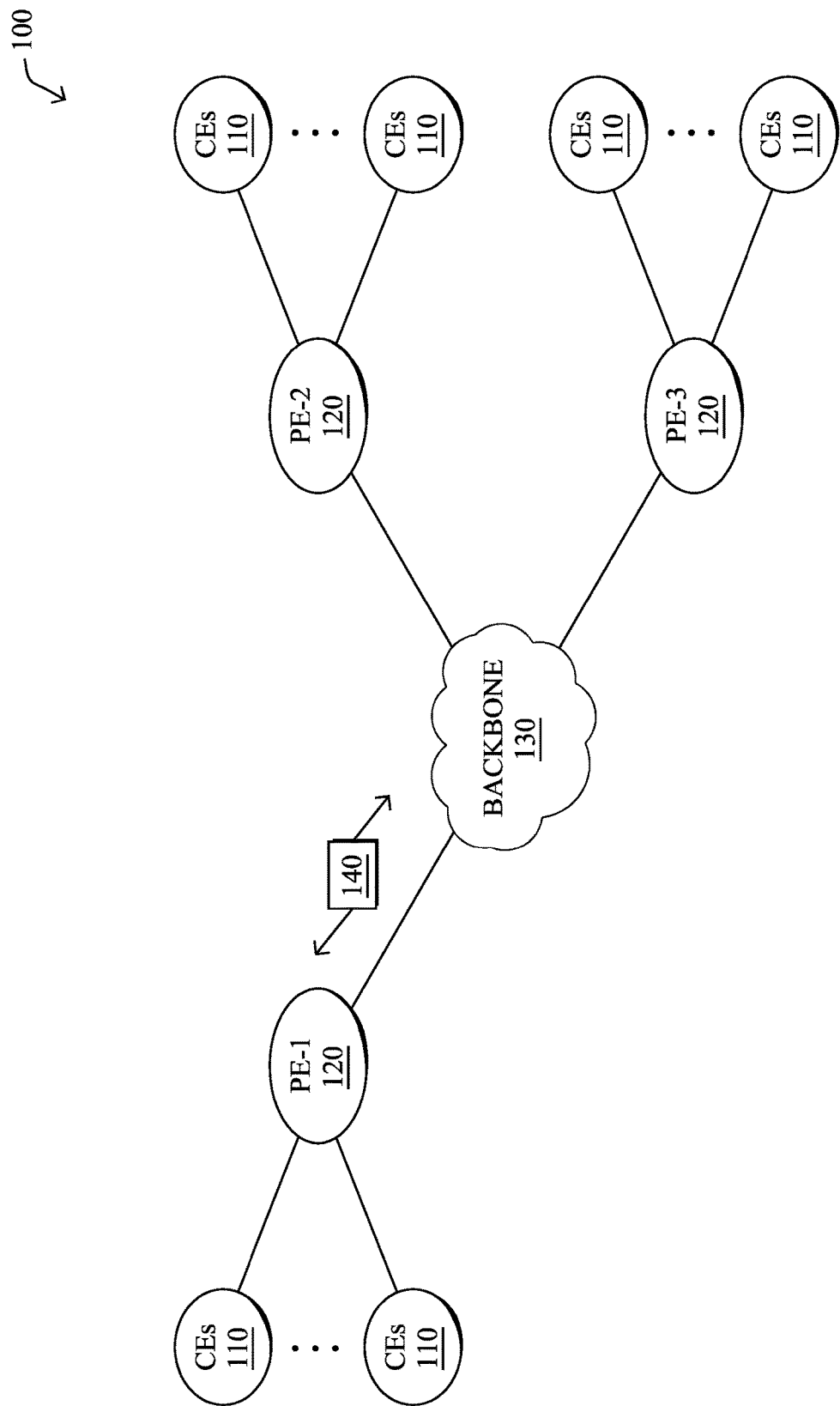
FIGS. 1A-1B illustrate an example computer network.

According to one or more embodiments of the disclosure, a device configures a plurality of subinterfaces for each of a plurality of physical ports of a software defined network (SDN). The device allocates a fixed amount of bandwidth to each of the subinterfaces. The device forms a plurality of midlays for the SDN by assigning subsets of the plurality of subinterfaces to each of the midlays. The device assigns a network slice to one or more of the midlays, based on a bandwidth requirement of the network slice.

Description

A computer network is a geographically distributed collection of nodes interconnected by communication links and segments for transporting data between end nodes, such as personal computers and workstations, or other devices, such as sensors, etc. Many types of networks are available, with the types ranging from local area is networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), is neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
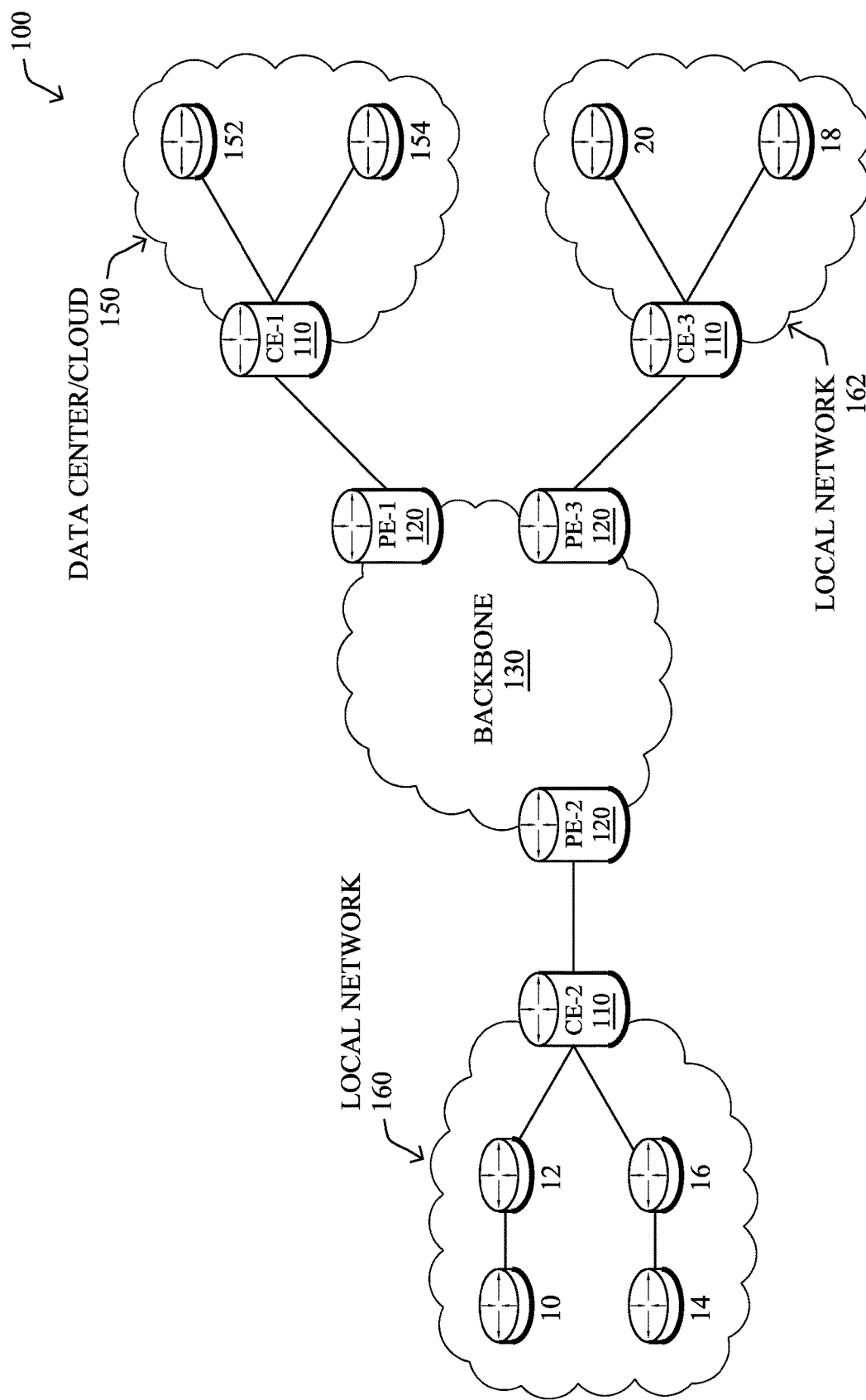

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
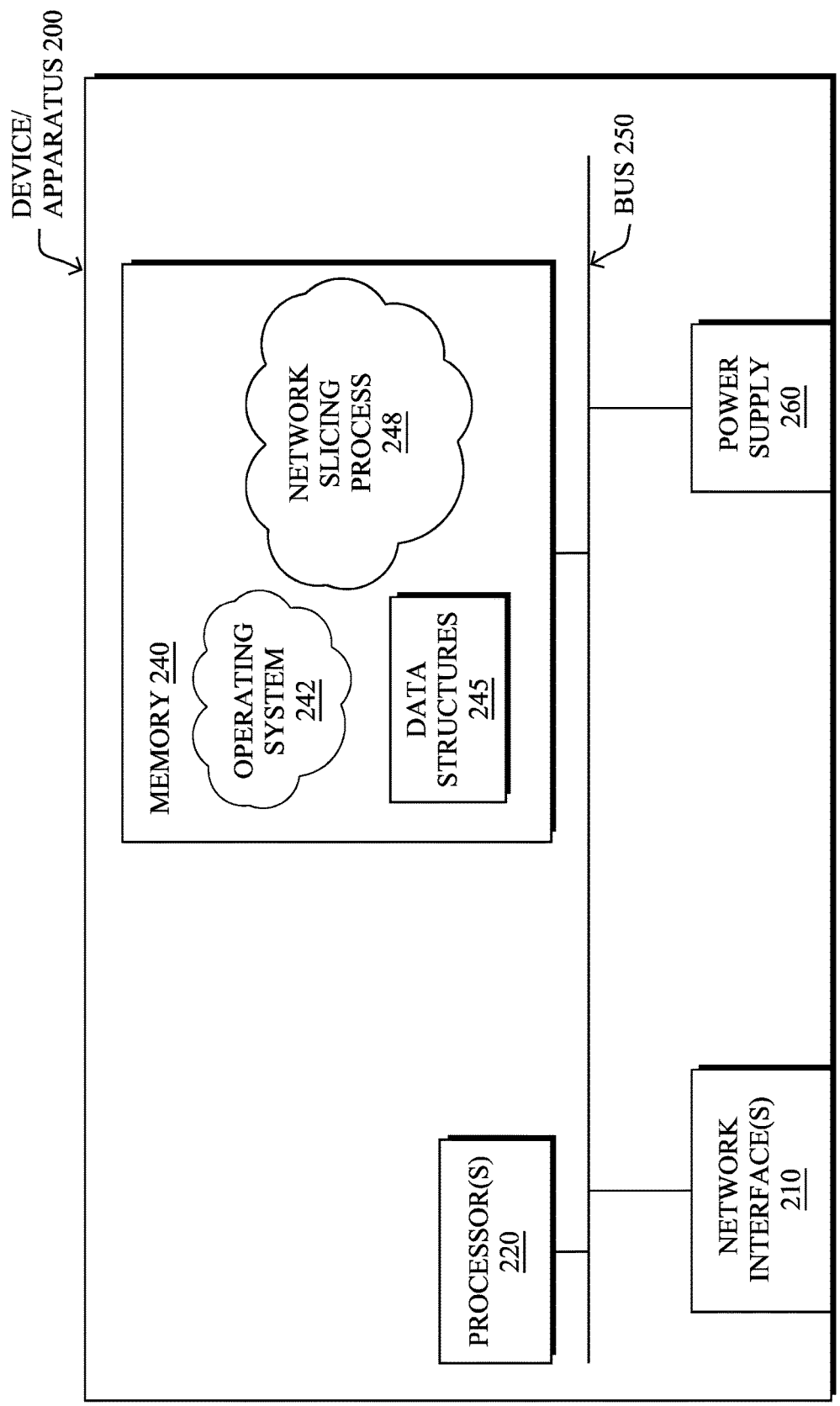
FIG. 2 illustrates an example network device/node.

FIG. 2 is a schematic block diagram of an example device/apparatus 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device/apparatus 200 may also be any other suitable type of device depending upon the type of network architecture in place, such as IoT nodes, etc. Device/apparatus 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network slicing process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Software defined networking (SDN) represents an evolution of computer networks that centralizes control plane decisions with a supervisory device. For example, in Application Centric Infrastructure (ACI), an SDN-based architecture from Cisco Systems, Inc., control plane decisions may be made by a centralized APIC. However, even with centralized control, there still exists the potential for seasonal congestion to occur on certain links in the network fabric.

In general, an SDN-based network fabric may utilize a leaf-spine architecture, such as CLOS and Fat-Tree architectures. This is particularly true in the case of data center and cloud networks that are poised to deliver the majority of computation and storage services in the future. In a Fat-Tree, nodes are organized in a tree structure with branches becoming 'fatter' towards the top of the hierarchy. In the context of computer networks, this increasing 'fatness' typically corresponds to increasing bandwidth towards the top of the hierarchy. CLOS networks typically involve multiple stages (e.g., an ingress stage, a middle stage, and an egress stage), with 'crossbar' switches at different stages that are interwoven such that multiple paths are available for switching, so that one traffic flow does not block another.

As would be appreciated, an SDN fabric that implements a leaf-spine architecture may operate by emulating a very large switch by interleaving many smaller switches, resulting in much lower cost and higher scalability. The benefits of such designs include, but are not limited to, the availability of an equal cost multi-path (ECMP) based switching fabric, a simplified network, and fully utilized link bandwidth on each network node. It also allows the networks to scale and grow incrementally, on demand. Cisco's next generation SDN based data center network fabric architecture, ACI, is also based on CLOS design principles.

Figure 3A:
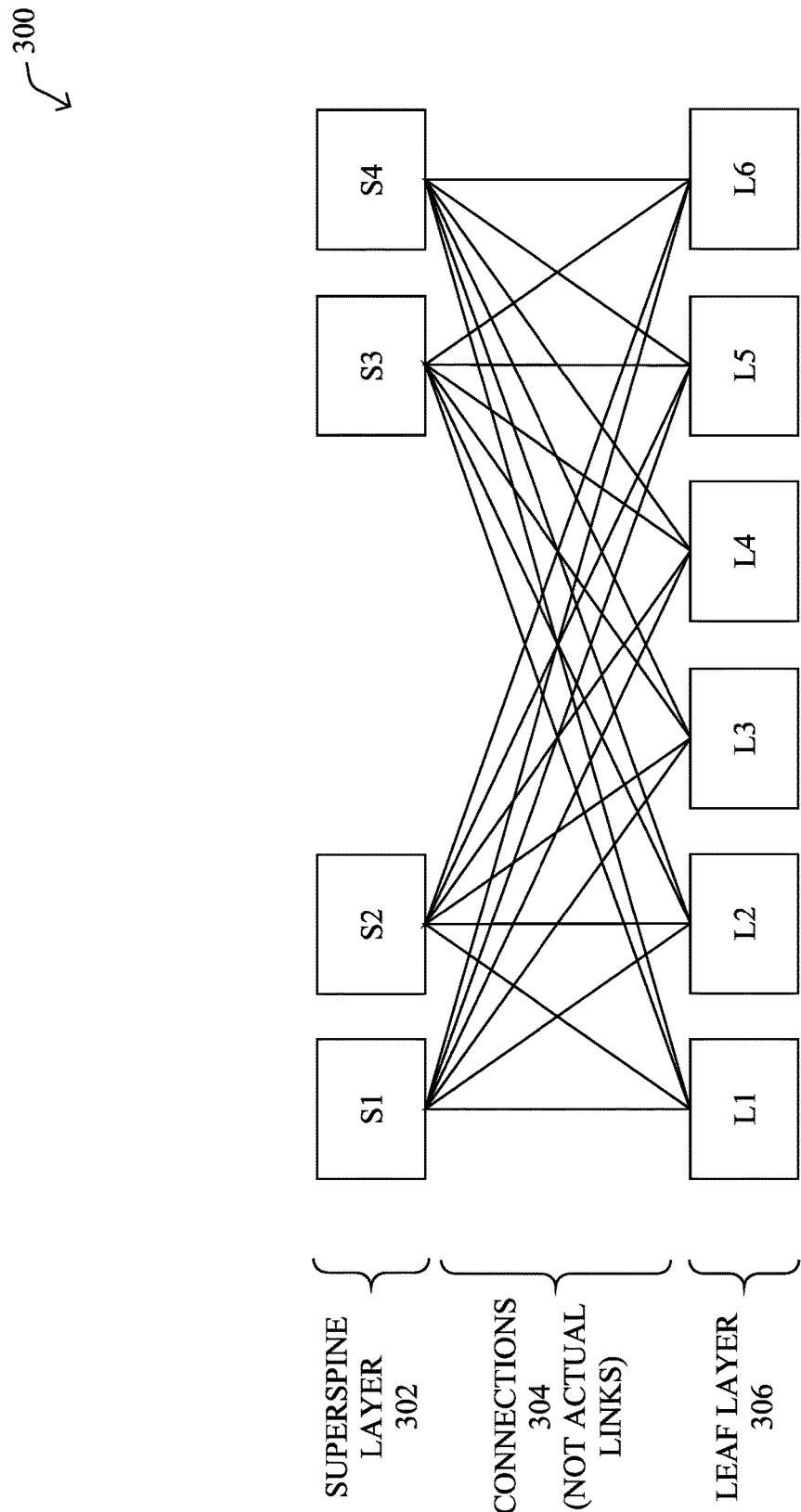
FIGS. 3A-3E illustrate examples of software defined networking (SDN) fabric implementations.

FIG. 3A illustrates a simplified example of an SDN fabric 300 that uses a leaf-spine architecture. As shown, the network switches S1-S4 and L1-L6 may be organized according to CLOS design principles. In particular, switches S1-S4 may form a superspine 302. This layer is also sometimes called the Top of Fabric (ToF) layer, such as in RIFT. At the south of fabric 300 is a leaf layer 306 that comprises switches L1-L6 and provide connectivity to the various clients of fabric 300, such as endpoints or virtual machines (VMs), and implement Layer 2 bridging and Layer 3 routing functions. Likewise, S1-S4 in superspine layer 302 may be fully meshed with L1-L6 in leaf layer 306 via connections 304, which are not actual links, in the physical sense. During operation, S1-S4 may provide redundant paths and connectivity from a previous lower-level stage switch in the network fabric.

Figure 3B:
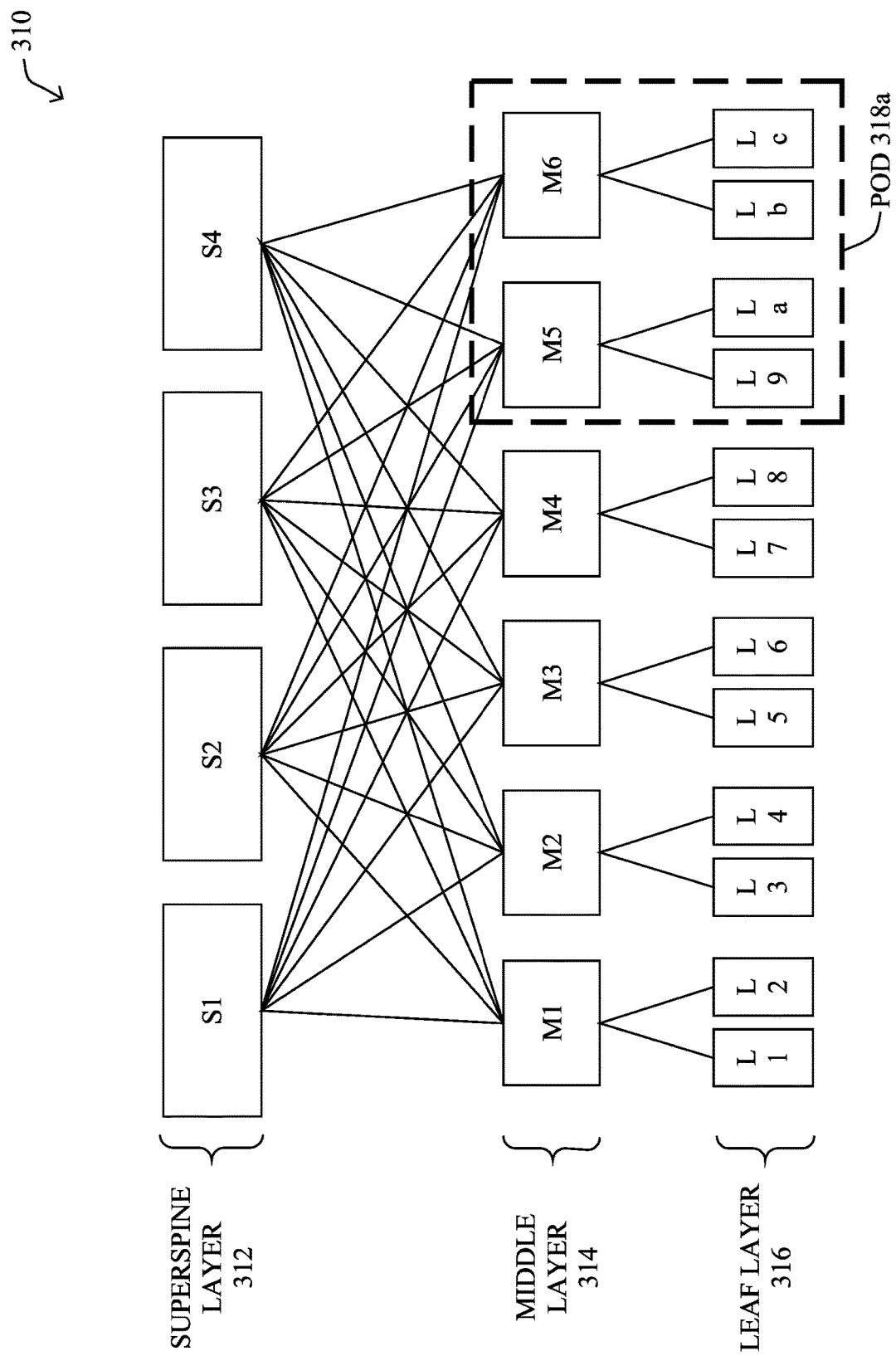

FIG. 3B illustrates another example SDN fabric 310 that uses a CLOS-based approach. As shown, at the top of fabric 310 are switches S1-S4 that form a superspine layer 312 that are connected to a middle layer 314 comprising switches M1-M6 which are, in turn, connected to a leaf layer 316 comprising switches L1-Lc. The overall function of fabric 310 may be similar to that of fabric 300 in FIG. 3A, with the addition of middle layer 314 that may perform, for example, aggregation functions. Leaf switches and their corresponding switches in middle layer 314 may also form pods, such as pod 318a shown.

Today, a large, virtualized data center fabric might be comprised of approximately 500-1000 leaf switches and as many as approximately 8-16 spine switches servicing many of its tenant's virtual networks on the shared, physical network infrastructure. Each leaf switch, in turn, may be connected to between 32-98 physical hypervisor servers, with each server hosting approximately 20 virtual servers/endpoints that estimate to between 1000-2000 endpoints connected per leaf switch. In such a shared network deployment, network access security becomes an important factor for consideration.

More specifically, in virtualized data center deployments, like ACI, the movement of endpoints from one leaf port to another, or from one endpoint group (typically tied to the dot1q VLAN the vSwitch tags to outgoing packets) to another within the same leaf or across leaf switches of the network fabric, is very common. In such loosely-coupled network connectivity models, where the locality of the endpoints is not fixed, the network fabric and the endpoints become vulnerable to attacks by the rogue devices. For example, if the initial network access or the subsequent endpoint moves are allowed without any verification, it might lead to severe security issues. This enforces an important requirement on the underlying first hop switches that are responsible for network connectivity: to grant network access only to authorized endpoints and deny connectivity to unauthorized devices.

To limit the number of ports per leaf switch, leaves are grouped in pods, such as pod 318a. As would be appreciated a pod in an SDN fabric is a cross bar of smaller switches and can be seen as a large, virtual leaf node, characterized by its Radix.

Figure 3C:
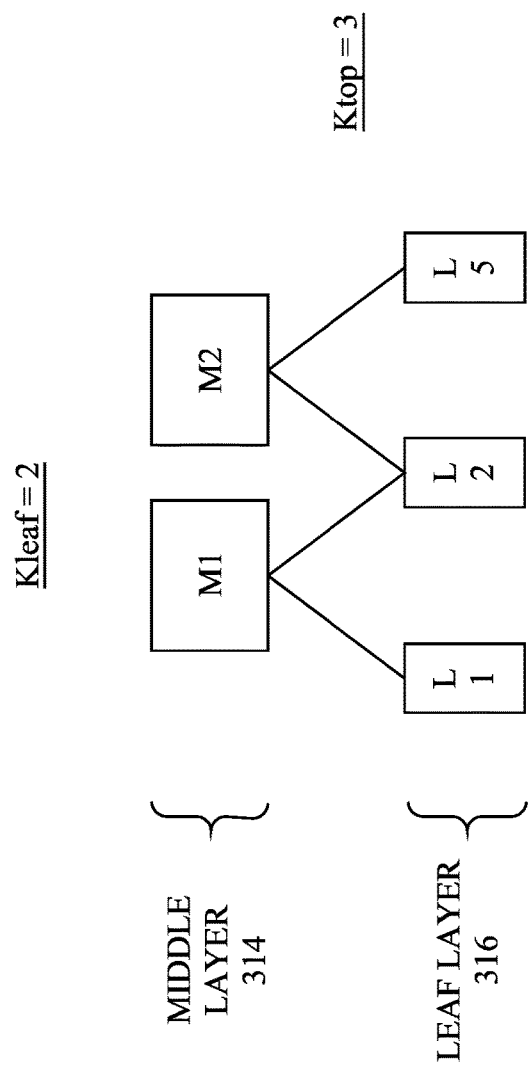

FIG. 3C illustrates an example pod 318 that can be formed by linking switches in middle layer 314 with those in leaf layer 316. As shown, pod 318 has (K=Radix/2) ports connecting upward and as many downward, with Kleaf=2 top nodes of Ktop ports down connected to Ktop leaves with Kleaf ports upward. This creates a virtual leaf node of (Kp=Kleaf*Ktop) ports. From there, pods of pods can be constructed recursively within the SDN fabric.

A Fat-Tree has a number of pods interconnected by a superspine. In an ideal fabric, there is at least one port per Top of Pod (ToP) switch on every Top-of-Fabric (ToF) switch in the superspine. This means that every northbound port of a leaf has a path to every spine node. In that case, the superspine is fully meshed with the pod top switches, and the fabric is NOT partitioned. For example, in FIG. 3B, assume that M1-M2 and M3-M4 in middle layer 314 also form pods with pod 318a. In such a case, the network would not be considered partitioned, as each of the pods is fully meshed with superspine layer 312.

In the case in which each pod is fully connected to superspine layer 312, a spine node has a Radix (number of ports) Rs=Np*Kleaf, where Np is the number of pods. This makes the connectivity from any spine node to any leaf node resilient to Kleaf-1 breakages in between. However, Rs rapidly becomes a gating factor for scalability, limiting the number of pods that can be attached to the superspine, in many implementations.

Figure 3D:
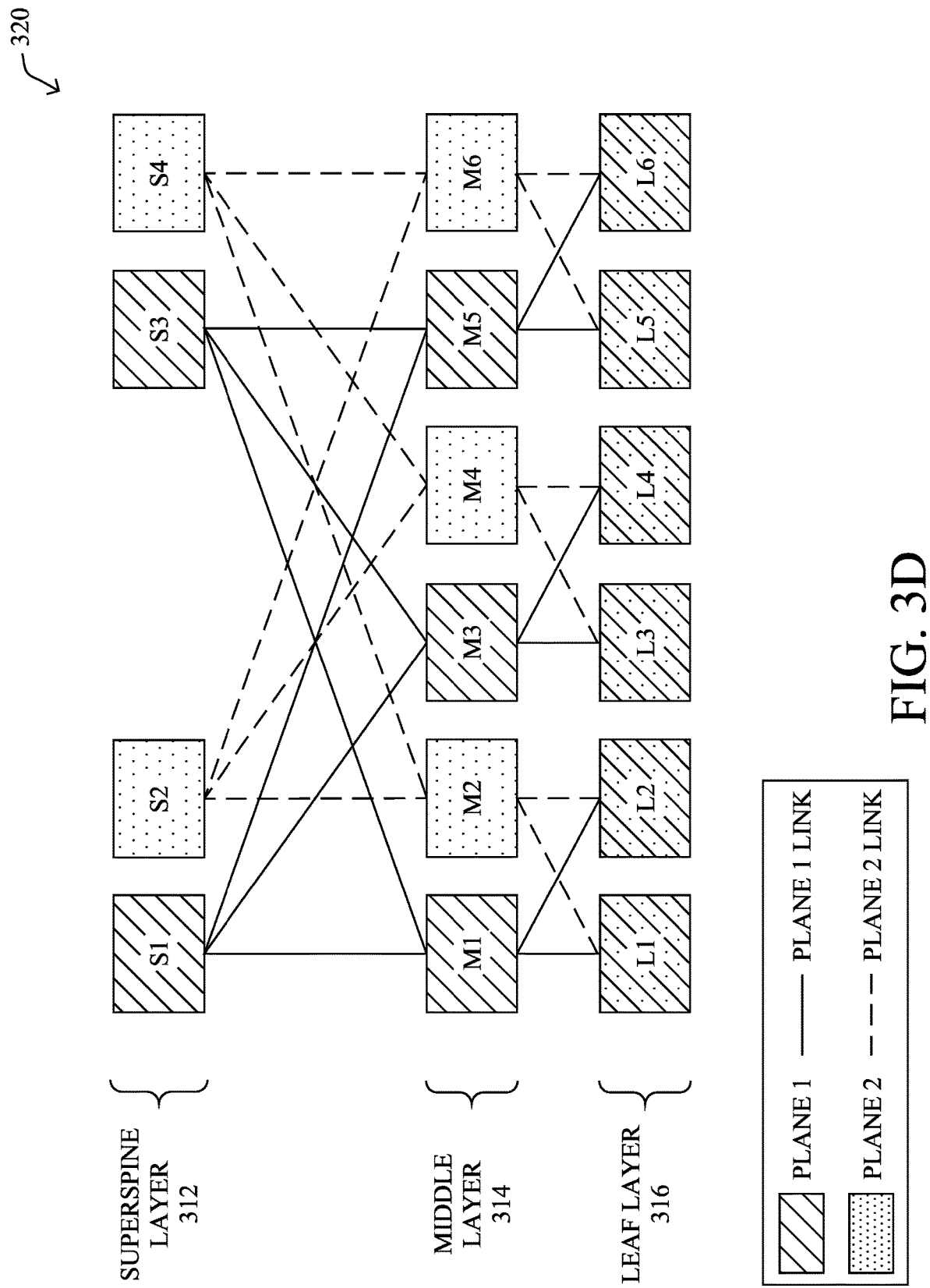

In large fabric, or fabrics built from switches with a low Radix, the ToF is often partitioned in planes. FIG. 3D illustrates an example SDN fabric 320 in which the fabric is partitioned into two separate planes: Plane 1 and Plane 2. As shown, while each ToF switch in superspine layer 312 is still connected to each leaf in leaf layer 316, not every ToF switch in superspine layer is connected to every ToP switch in middle layer 314. This means that the redundancy is reduced, in comparison to non-partitioned fabrics.

Figure 3E:
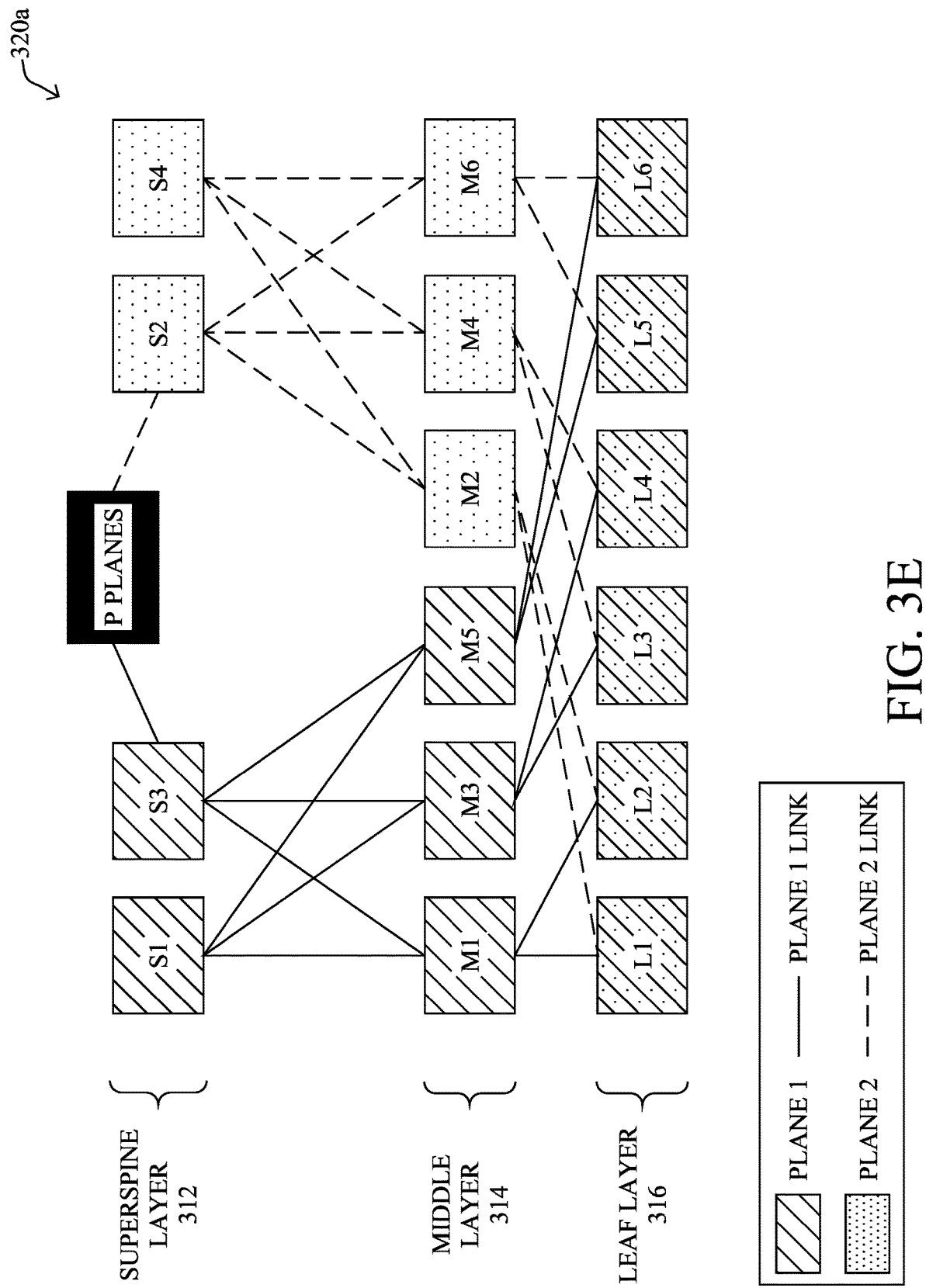

FIG. 3E illustrates another example SDN fabric 320a in which the fabric has been partitioned into P+2 number of planes: plane 1, plane 2, and P-number of other planes. As would be appreciated, the decision as to which plane to use in SDN fabric 320a is left to the leaves in leaf layer 316. In addition, a failure of an intermediate link or switch typically affects one or more planes, but not all.

The minimum connectivity for an SDN fabric, such as fabric 320a, is when each leaf in leaf layer 316 has a single path to each node in superspine layer 312, which happens when every ToF node connects to only one ToP node in each pod. This means that, at a maximum, there are exactly as many planes as there are northbound ports on a leaf Node (Kleaf=P*R). In that case, the ToF is maximally partitioned.

As noted above, 5G networks are increasingly moving towards a model that uses network slicing to effectively create multiple virtual networks on top of a shared, physical network. In general, network slicing leverages SDN and network functions virtualization (NFV) techniques, to form an end-to-end virtual network that encompasses the networking functions, as well as the storage and compute functions of the network.

By way of example, consider a deployment of IoT sensors that each have their own 5G transceiver, to report sensor readings to a cloud-based monitoring and analytics service. Today, each transceiver would have its own associated data plan and share the same resources of the network with many other devices outside of the deployment (e.g., people's phones, tablets, etc.). Such an approach does not, however, take into account the specific needs of the different devices. Indeed, mobile phones may be far less tolerant of network latency than that of the IoT sensors. Moreover, the IoT sensors may only report readings very sporadically, whereas the phone may constantly send and receive data throughout the day. Network slicing allows the physical network to be divided into different virtual networks, such as an "IoT sensor" slice and a "mobile phone" slice, effectively creating different "lanes" for the two different types of traffic.

Overlays enable end-to-end communications, and it is possible to build more than one overlay to serve different network slices. However, it is not currently possible to associate physical resources to the overlays, since routing is decided in the underlay (e.g., the physical network). In order to really fit the slicing model, each overlay would need its own underlay with its own slice of the physical resources.

Using a Midlay in an SDN Fabric for Adjustable Segmentation and Slicing

The techniques herein leverage the concept of a midlay between the underlay and overlay of a network to implement network slicing. In some aspects, subinterfaces can be configured for the physical ports in the underlay and used to form the midlays, effectively forming virtual underlays on which the overlays can be built. This enables real slices to be implemented and, potentially, a Fat Tree-as-a-service model.

Specifically, according to one or more embodiments of the disclosure as described in detail below, a device configures a plurality of subinterfaces for each of a plurality of physical ports of a software defined network (SDN). The device allocates a fixed amount of bandwidth to each of the subinterfaces. The device forms a plurality of midlays for the SDN by assigning subsets of the plurality of subinterfaces to each of the midlays. The device assigns a network slice to one or more of the midlays, based on a bandwidth requirement of the network slice.

Illustratively, the techniques described herein may be performed by hardware, software, and/or firmware, such as in accordance with the network slicing process 248, which may include computer executable instructions executed by the processor 220 (or independent processor of interfaces 210) to perform functions relating to the techniques described herein.

Operationally, the techniques herein introduce the concept of network midlays constructed from subinterfaces having fixed allocated bandwidths, to implement network slicing in an adjustable manner.

Figure 4A:
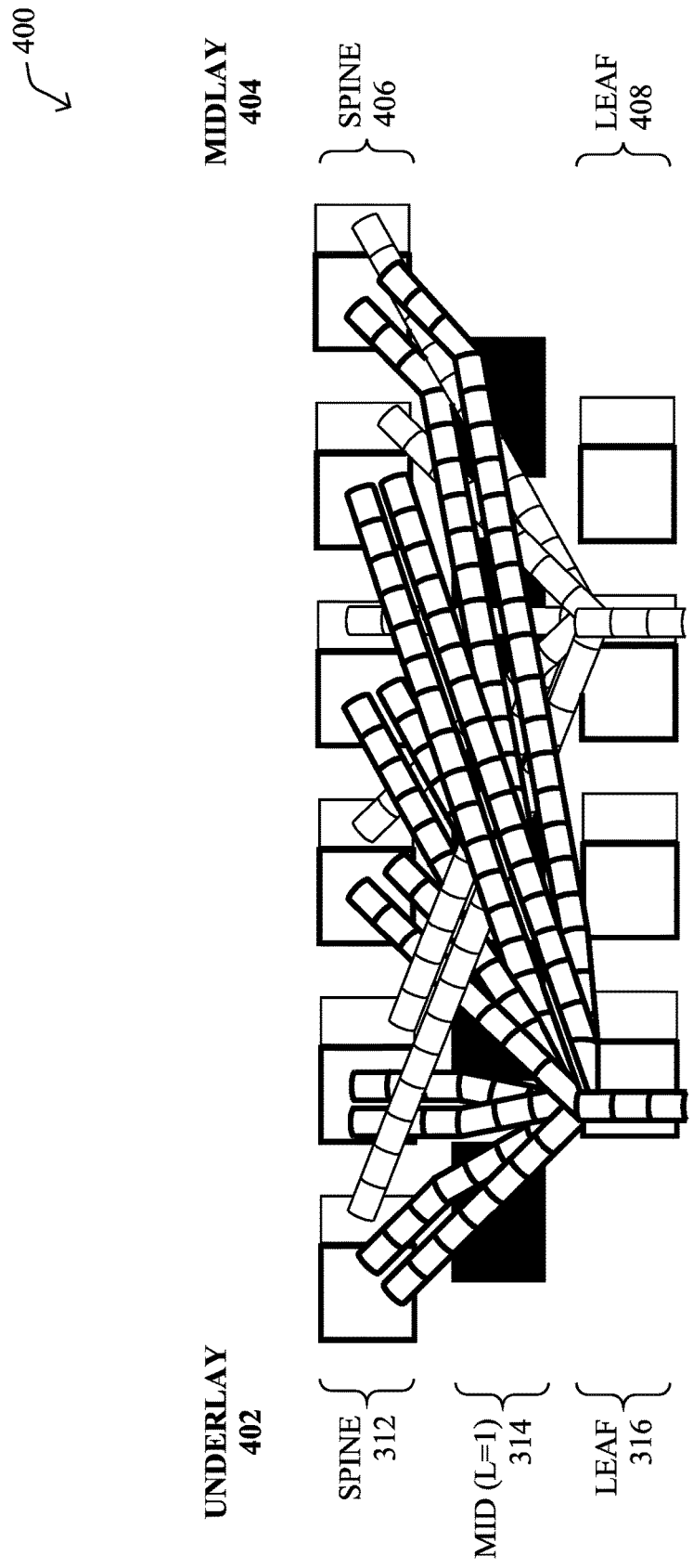

FIG. 4A illustrates an example network 400 having a physical underlay 402 comprising a leaf layer 316, middle layer 314, and a (super)spine layer 312, as described previously. A key aspect of the techniques herein is the concept of a "midlay" that acts as an intermediate layer between the fabric underlay and overlay(s). For example, as shown, a midlay 404 may be formed on top of underlay 402 of network 400 that essentially divides network 400 into subsets/segments. In various embodiments, midlay 404 may take the form of a collection of Fat Trees implemented over circuits between leaf layer 408 (e.g., leaf layer 316 in underlay 402) and spine layer 406 (e.g., spine layer 312 in underlay 402).

The midlay circuits of midlay 404 may be bidirectional and installed by a central controller (e.g., device/apparatus 200) over the physical fabric/underlay 402. In various embodiments, midlay 404 may be implemented over underlay 402 using a multi-topology routing technique, using virtual routing and forwarding (VRF) or similar for the routing and MPLS or virtual LAN (VLAN) tagging to indicate midlay 404 in the forwarding plane. In another embodiment, midlay 404 can also be formed using a less elastic approach, such as using Flexible Ethernet (FlexE).

As detailed below, the concept of a midlay can be extended to form Fat Tree slices and enable a Fat Tree-as-a-service model whereby a cloud provider not only hosts VMs, but also hosts full dedicated fabrics with the same ease of use to add and modify fabrics as in the overlay. The gist of the techniques herein is that subinterfaces on the physical ports in the underlay can be used to create midlays for each network slice. This is in contrast, for example, to simply implementing the midlay using tunnels. While the 'diameters' of tunnels can be increased to afford more bandwidth, which is adequate for statistical QoS processing, doing so may not be adequate to allocate more bandwidth to network slices.

Figure 4B:
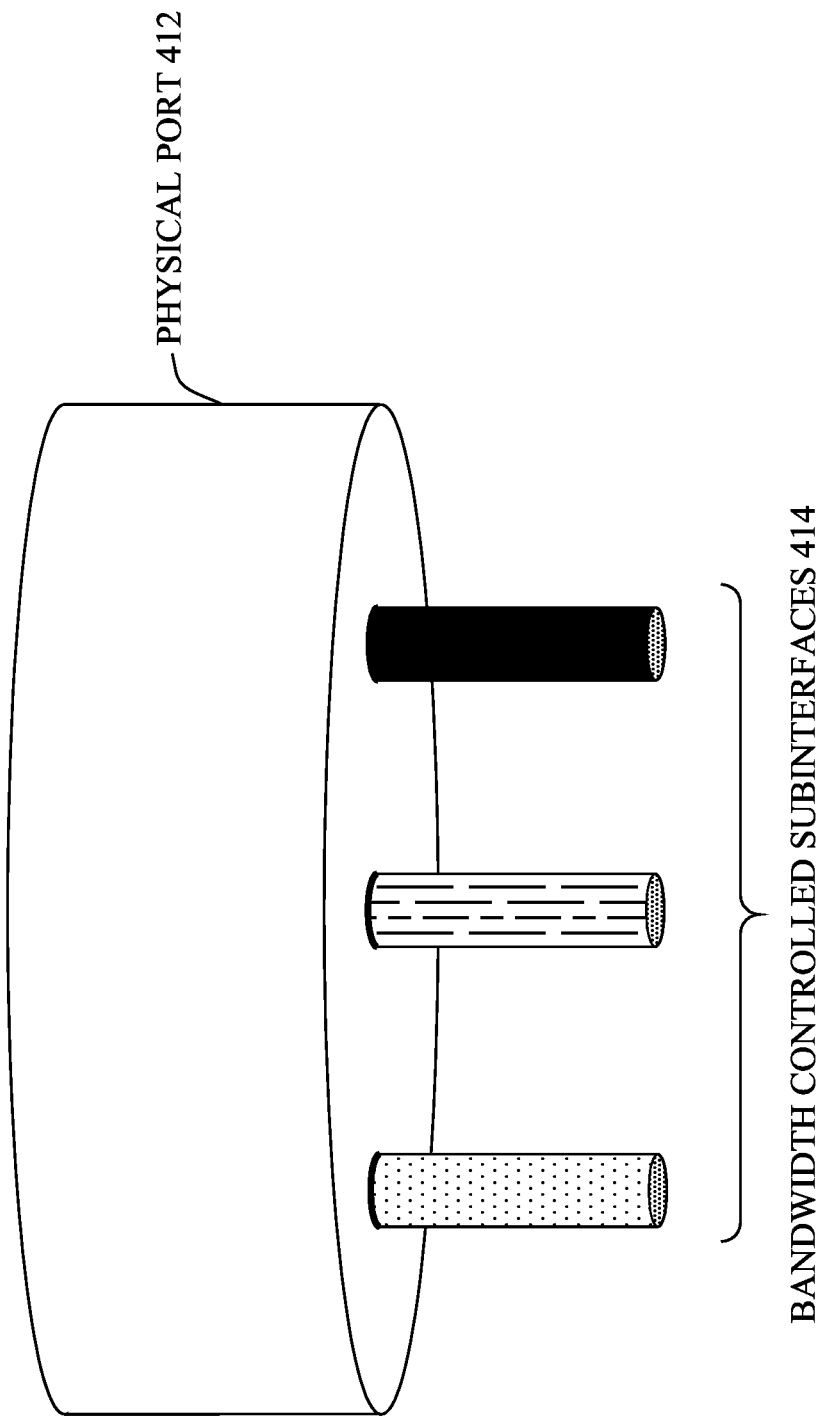

Using the techniques herein, a midlay may comprise a collection of subinterfaces of a larger underlay, whereby each subinterface has a fixed bandwidth. This can be enforced, for instance, using FlexE or Time Sensitive Networking (TSN)/802.1Qbv. FIG. 4B illustrates an example of a physical port 412 for which an SDN controller or other supervisory device/apparatus (e.g., device/apparatus 200) may configure any number of bandwidth-controlled subinterfaces 414. To form a midlay, the controller may first dynamically add ingress subinterfaces to leaves of the network, as well as adding subinterfaces all the way to the spine, and allocate a set amount of bandwidth to each interface. To the overlay above, the miday will look like a fabric that is a subset of the underlay fabric. In other words, the teachings herein propose using a model in which a virtual CLOS is associated to each network slice, which can be adapted dynamically in capacity according to the bandwidth requirements of the slice.

To further highlight the teachings herein, consider the case shown in FIG. 4C. As shown, assume that a cloud provider associates VMs with three different sets of endpoints (e.g., three different customer networks). Packets 422 for these sets of endpoints are represented in FIG. 4C as solid, dashed, and dotted arrow, accordingly. Under a traditional approach, packets 422 will share the communal network resources, such as physical port 412. During operation, packets 422 received on physical port 412 may be statistically multiplexed. However, this means that a given flow could still suffer from incast in the network due to the activity of other slices.

Figure 4D:
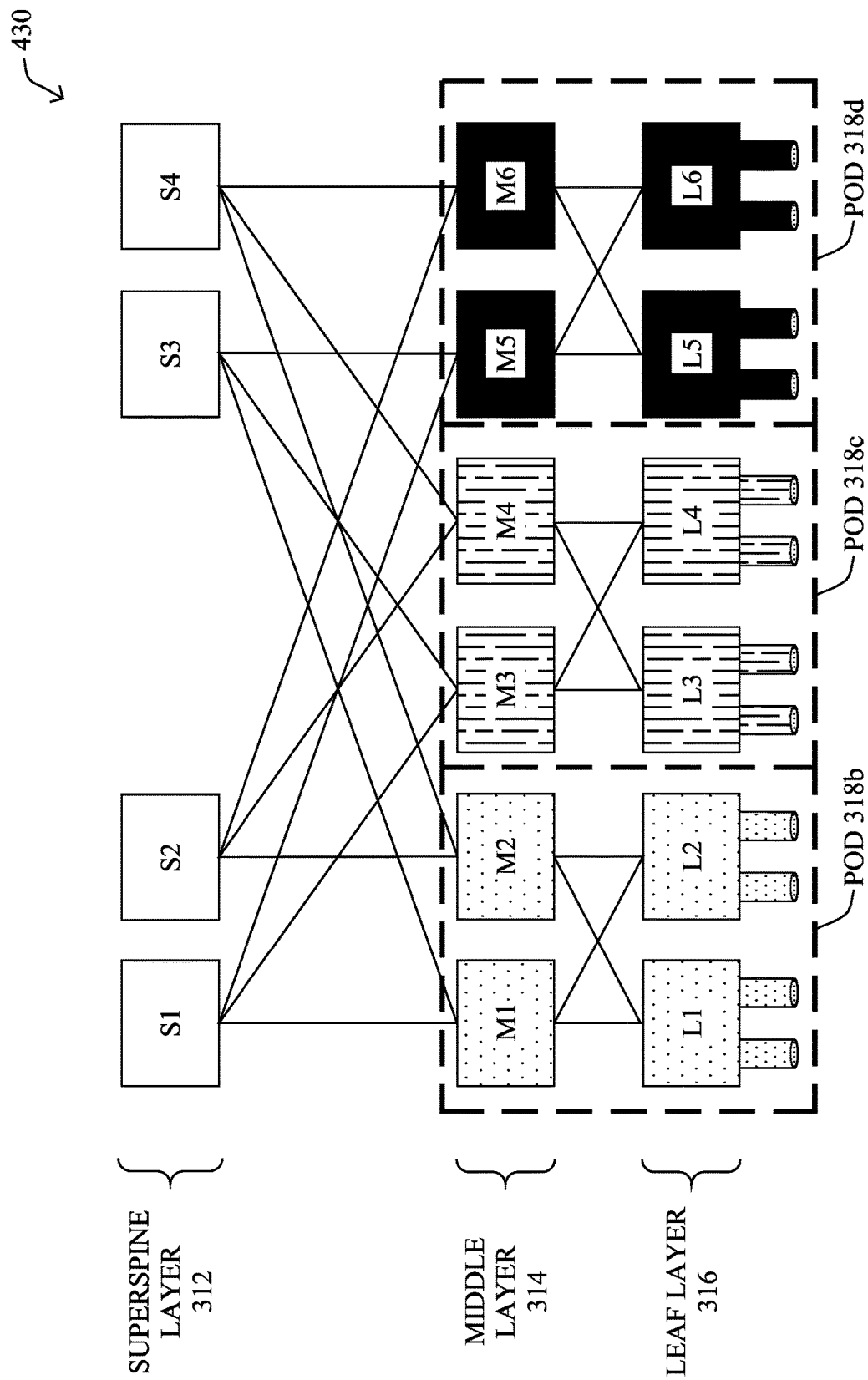

To avoid one slice consuming the bandwidth needed by another slice, FIG. 4D illustrates a potential fabric configuration 430 in which the slices are assigned to dedicated pods. For example, one slice may be assigned to pod 318a, another to pod 318b, and a third to pod 318c. Doing so makes it such that in-slice traffic does not leak into superspine layer 312 and underutilizes the superspine. While the arrangement shown in FIG. 4C is functional, better arrangements are also possible, as a failure in one pod 318 means that the entire slice will go down.

Figure 5:
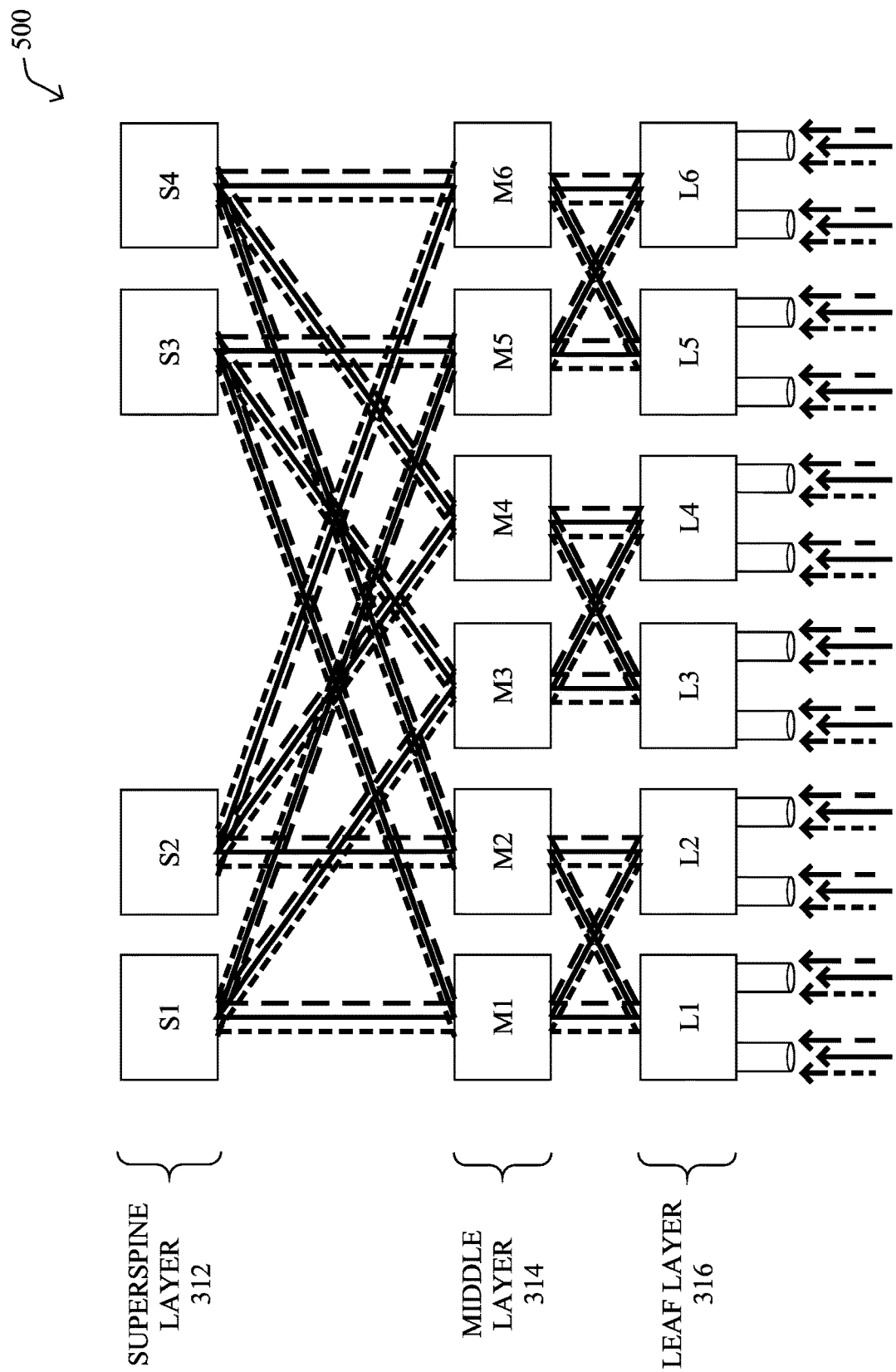
FIG. 5 illustrates an example of using midlays to allocate bandwidth in an SDN to network slices.

FIG. 5 illustrates another example 500 of using midlays to allocate bandwidth in an SDN to network slices, according to various embodiments. Similar to the example of FIG. 4D, midlays may be built and assigned to each network slice, allocating bandwidth on each hop for each slice. Routing can also be communalized on the underlay or done per slice in each midlay. Further, a fixed amount of bandwidth can be allocated in each ingress and each infrastructure link can be associated to a slice. Such a configuration can be enforced, for example, using TSN shapers or FlexE mechanisms.

In FIG. 5, assume again that there are three different slices, represented as solid, dashed, and dotted lines, accordingly. In some embodiments, rather than assign each slice to its own pod as in FIG. 4D, in the arrangement shown in FIG. 5, the controller may form midlays for the slices that divide the risk across the network. For simplicity, assume that the controller configures subinterfaces for each physical port such that the overall bandwidth is divided evenly and forms midlays for each of the slices, accordingly.

As a result, each slice is still allocated the same overall bandwidth as in FIG. 4D, but the slices can now utilize their own share of all resources of the fabric, including super spine layer 312. Thus, only a third of the traffic for any given slice now flows through any particular device in the network, greatly reducing the damage if an equipment failure occurs.

In other words, the arrangement shown has the added benefit that the consequences of a failure of a physical device (e.g., loss of a percentage of ECMP bandwidth, etc.) is now divided across the network. The risk sharing approach shown also isolates the risks of incast due to a particular slice exceeding its allocated resources, since the subinterfaces associated with each slice have fixed bandwidth allocations, already.

Figure 6A:
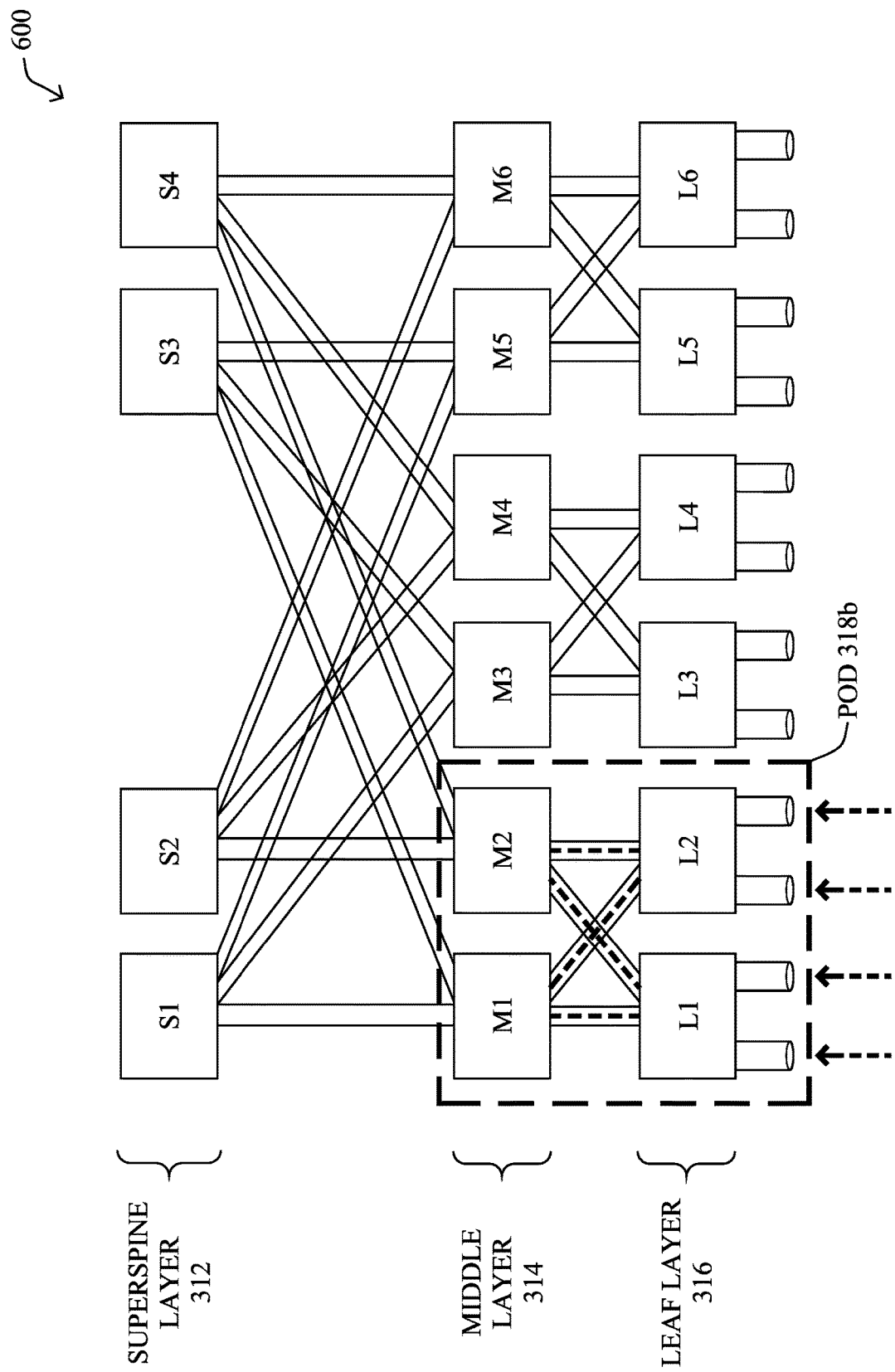
FIGS. 6A-6C illustrate examples of dynamically allocating bandwidth for a network slice.
Figure 6B:
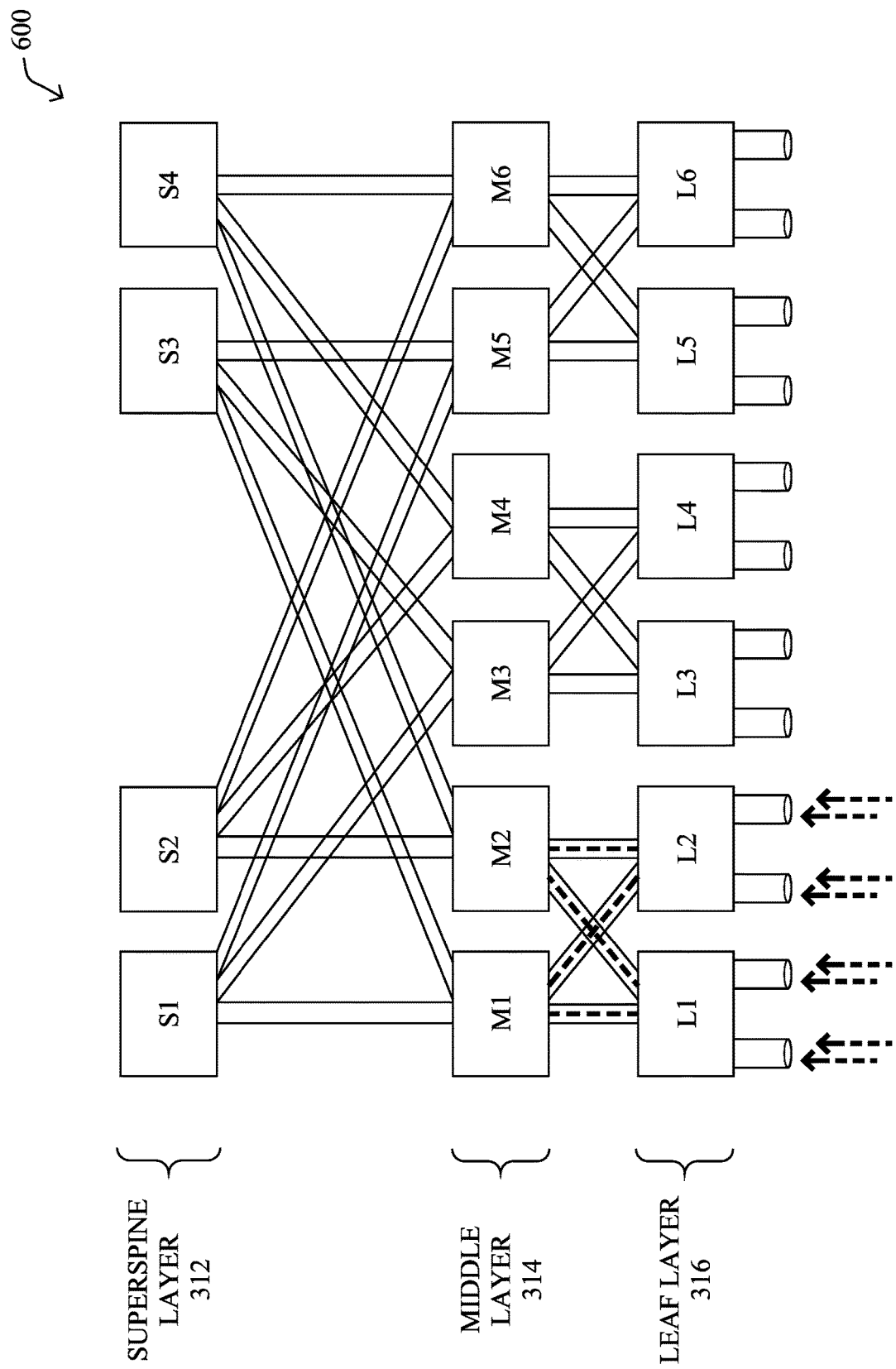
Figure 6C:
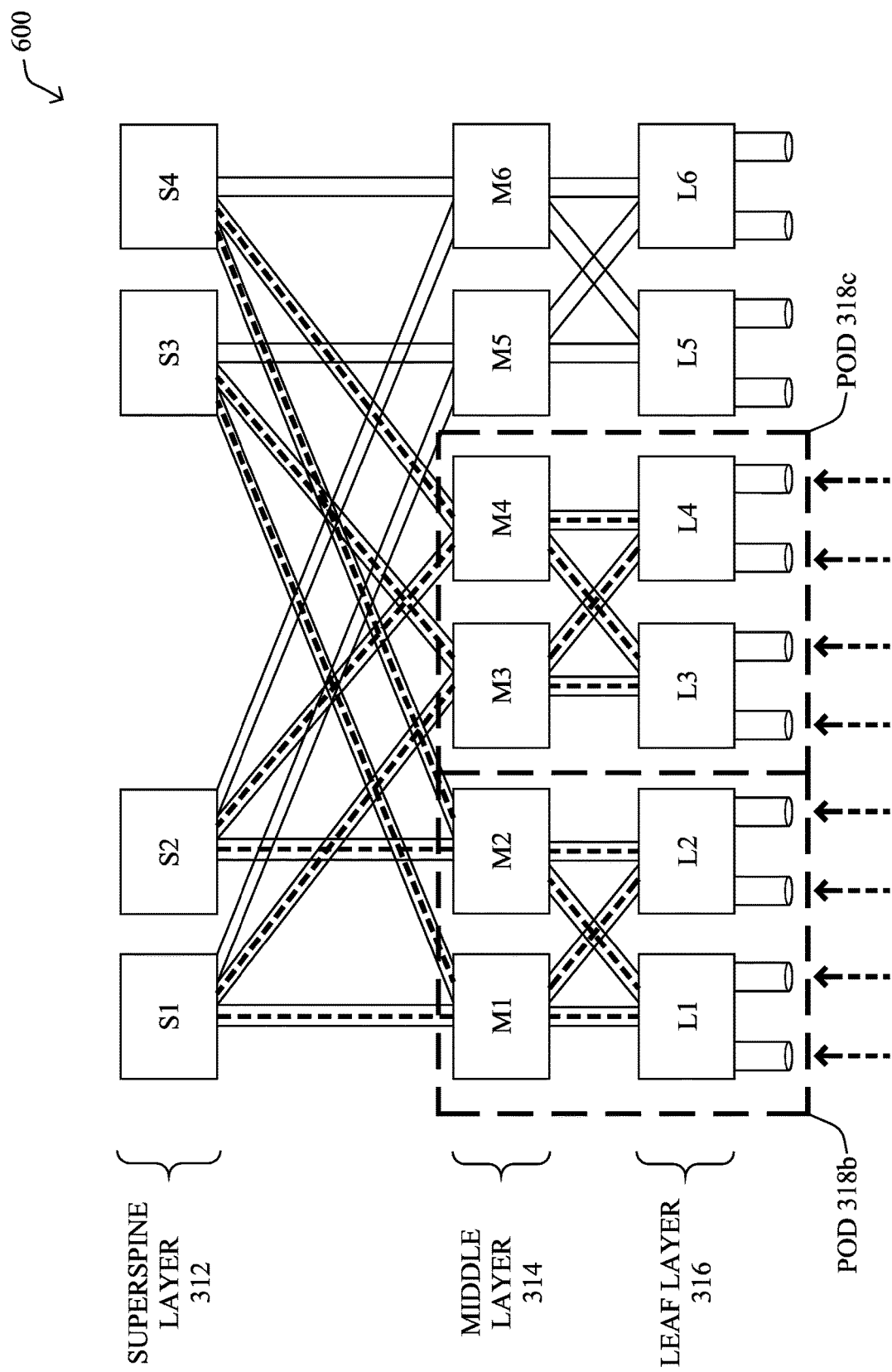

FIGS. 6A-6C illustrate further examples of dynamically allocating bandwidth for a network slice, in accordance with the teachings herein. Currently, it is relatively easy to add VMs to any server connected to the underlay, but cloud switching is perceived as a non blocking infinite resource, which is never actually the case. In further embodiments, the techniques herein can be used to enable a slice-as-a-service model, to paint per-slice midlay fabrics over the underlay, as needed.

As shown in example 600 in FIG. 6A, in further embodiments, the controller may form a midlay for a network slice by allocating subinterfaces on a minimal amount of links while respecting any or all of the following Fat Tree rules:
at each hop there is equal bandwidth north and south
cross bars at each layer ensure redundancy
Consider, for example, the network slice represented by dotted lines in FIG. 6A. For illustrative purposes, assume that the controller configures ten subinterfaces per port, each with 10% of the total available bandwidth and that the slice only requires the minimal possible bandwidth in a single pod 318b. In such a case, the controller may form a midlay for the slice that includes only one subinterface per physical port.

Assume now that the bandwidth requirements of the network slice increase over time. In such a case, the controller may take one of two different approaches, to allocate more bandwidth to the slice.

One possible way to dynamically adjust the bandwidth of a network slice is shown in FIG. 6B. In some embodiments, when the network slice requires more bandwidth than is currently allocated to it, the controller may add more subinterfaces to the midlay associated with the network slice. For example, as shown, the controller may double the number of subinterfaces for the midlay of the network slice, to effectively double the amount of bandwidth for the slice. However, as mentioned previously, diversifying the use of the physical network by the slice also helps to reduce the impact of a device failure on the slice.

Another possible way to dynamically adjust the bandwidth of a network slice is shown in FIG. 6C. In further embodiments, rather than simply increasing the number of subinterfaces of the current midlay associated with the network slice, the controller may instead adjust the midlay to extend the midlay and number of subinterfaces to other pods. For example, rather than simply double the number of interfaces of the midlay for the network slice in pod 318*b*, the controller may instead assign additional subinterfaces from pod 318*c* to the midlay. This arrangement has the added benefit of reducing the impact on the network slice, should one of the physical devices of the underlay (e.g., leaf L1) fails.

Of course, the controller may also take a holistic approach to dynamically allocating bandwidth for network slices, so as to optimize the dispositions of their midlays and serve their various needs. In other words, the controller may take into account any or all of the network slices, when dynamically allocating bandwidth to a particular slice, so as to meet the requirements of all of the slices.

In some embodiments, the controller may also dynamically adjust slices without an explicit request to do so, thereby offering a service-as-you-go model. By monitoring the traffic usage per-slide, the controller may dynamically adjust the midlays for the slices and their associated bandwidths, based on their traffic. For example, the controller may allocate K * average-traffic-usage over past T minutes, with K varying from 1 to K_Max (K>1 meaning over provisioning). In a further embodiment, the controller could forecast the traffic demand and pre-allocate bandwidth for a slice before ever seeing the traffic of the slice on the fabric.

Figure 7:
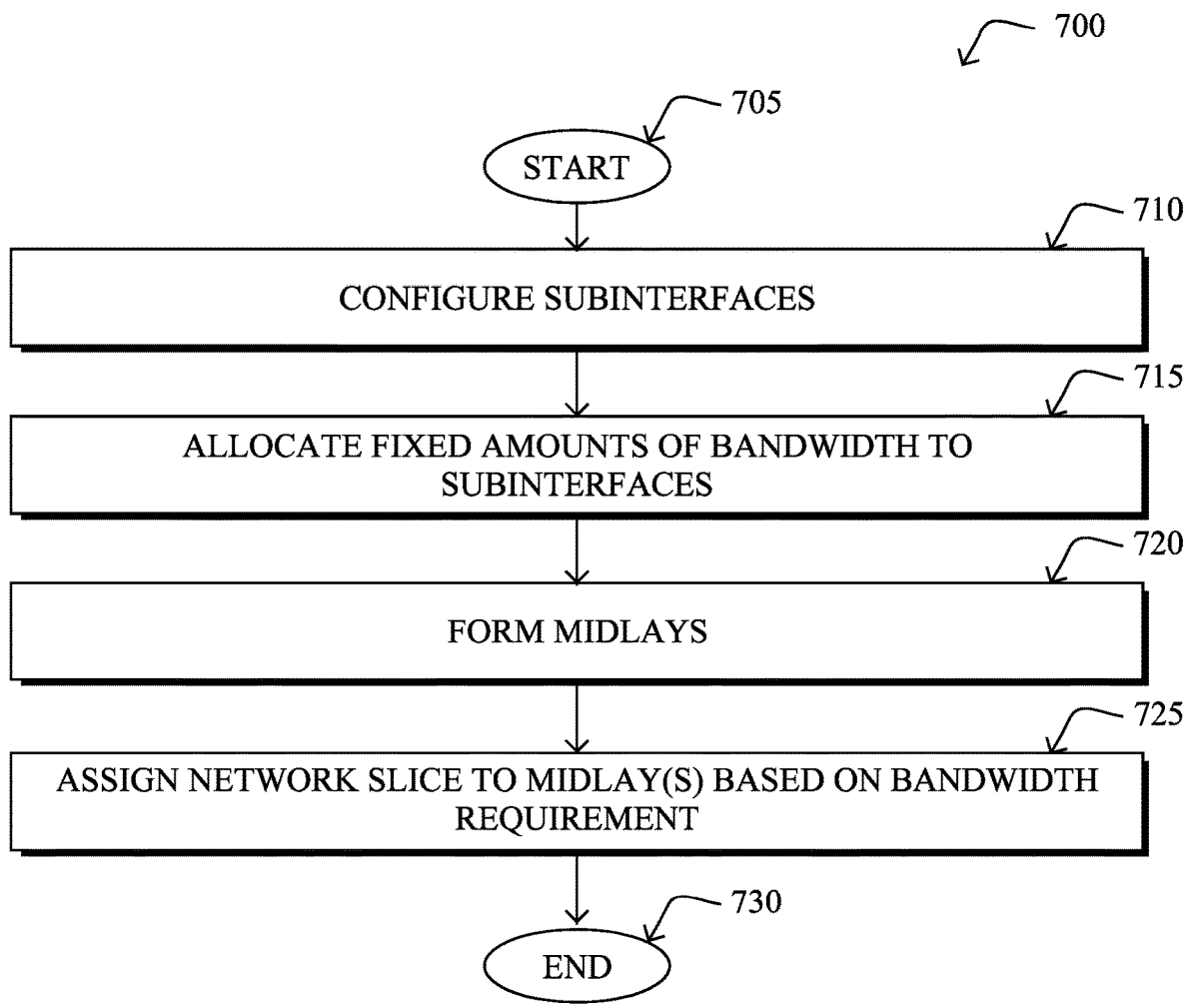
FIG. 7 illustrates an example simplified procedure for using a midlay for adjustable segmentation and slicing.

FIG. 7 illustrates an example simplified procedure for using a midlay for adjustable segmentation and slicing in a network in accordance with one or more embodiments described herein. For example, a non-generic, specifically configured device (e.g., device 200) may perform procedure 700 by executing stored instructions (e.g., process 248), such as a controller for an SDN fabric. The procedure 700 may start at step 705, and continues to step 710, where, as described in greater detail above, the device may configure a plurality of subinterfaces for each of a plurality of physical ports of the SDN fabric.

At step 715, as detailed above, the device may allocate a fixed amount of bandwidth to each of the subinterfaces. For example, the device may use FlexE or TSN-based commands, to allocate and enforce a specific amount of bandwidth per subinterface. In some cases, the device may allocate proportionate amounts of bandwidth to the subinterfaces. For example, if a given port is divided into five subinterfaces, each subinterface may be allocated 20% of the total bandwidth. However, other embodiments also provide for disproportionate amounts of bandwidth.

At step 720, the device may form a plurality of midlays for the SDN by assigning subsets of the plurality of subinterfaces to each of the midlays, as described in greater detail above. In some embodiments, a midlay may comprise one or more Fat Trees between one or more leaves of the SDN and a spine of the SDN. In addition, a midlay may operate as an intermediate layer between a physical/underlay layer of the SDN and an overlay layer of the SDN. In some embodiments, routes in the SDN can be established for the midlays using VRF and the midlays can be indicated in the forwarding plane of the SDN using MPLS or VLAN tagging.

At step 725, as detailed above, the device may assign a network slice to one or more of the midlays, based on a bandwidth requirement of the network slice. As would be appreciated, by using subinterfaces and midlays, this allows the controller to dynamically adjust the amount of bandwidth for the slice, such as by adding subinterfaces to the midlay(s) of the slice. In some cases, the one or more of midlays to which the network slice is assigned span multiple physical pods of the SDN, also offering additional protection against device failures and other issues. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, address the shortcomings of existing network slicing approaches by allowing physical resources to be associated with the overlays through the use of 'midlays' comprising sets of subinterfaces with fixed amounts of bandwidth. In some aspects, the techniques herein also allow for bandwidth to be dynamically allocated to a given network slice, letting the bandwidth of the service grow or shrink as needed, by associating more or fewer subinterfaces to the midlay of the slice.

While there have been shown and described illustrative embodiments that provide for using a midlay in an SDN fabric, it is to be understood that various other adaptations and modifications may be made within the spirit and scope of the embodiments herein. For example, while certain protocols are shown, such as FlexE, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    configuring, by a device, a plurality of subinterfaces for each of a plurality of physical ports of a software defined network (SDN);
    allocating, by the device, a fixed amount of bandwidth to each of the subinterfaces to construct a plurality of midlays for the SDN;
    forming, by the device, the plurality of midlays by assigning subsets of the plurality of subinterfaces to each of the midlays, wherein the plurality of midlays operate as an intermediate layer between a physical layer of the SDN and an overlay layer of the SDN to implement network slicing; and
    assigning, by the device, a network slice to one or more of the midlays, based on a bandwidth requirement of the network slice.

2. The method as in claim 1, wherein a particular one of the plurality of midlays comprises one or more Fat Trees between one or more leaves of the SDN and a spine of the SDN.

3. The method as in claim 1, further comprising:
allocating, by the device, more bandwidth to the slice by assigning at least one additional subinterface to the one or more midlays to which the network slice is assigned.

4. The method as in claim 1, wherein the one or more of midlays to which the network slice is assigned span multiple physical pods of the SDN.

5. The method as in claim 1, wherein the device uses Flexible Ethernet (FlexE) or Time Sensitive Networking (TSN) commands to allocate the fixed amount of bandwidth to each of the subinterfaces.

6. The method as in claim 1, wherein forming the plurality of midlays for the SDN by assigning subsets of the plurality of subinterfaces to each of the midlays comprises:
using virtual routing and forwarding (VRF) to establish routes in the SDN for the midlays.

7. The method as in claim 1 further comprising:
indicating the midlays in a forwarding plane of the SDN using Multiprotocol Label Switching (MPLS) or virtual local area network (VLAN) tagging.

8. An apparatus, comprising:
one or more network interfaces to communicate with a software defined networking (SDN) fabric;
a processor coupled to the network interfaces and configured to execute one or more processes; and
a memory configured to store a process executable by the processor, the process when executed configured to:
configure a plurality of subinterfaces for each of a plurality of physical ports of a software defined network (SDN);
allocate a fixed amount of bandwidth to each of the subinterfaces to construct a plurality of midlays for the SDN;
form the plurality of midlays by assigning subsets of the plurality of subinterfaces to each of the midlays, wherein the plurality of midlays operate as an intermediate layer between a physical layer of the SDN and an overlay layer of the SDN to implement network slicing; and
assign a network slice to one or more of the midlays, based on a bandwidth requirement of the network slice.

9. The apparatus as in claim 8, wherein a particular one of the plurality of midlays comprises one or more Fat Trees between one or more leaves of the SDN and a spine of the SDN.

10. The apparatus as in claim 8, wherein the process when executed is further configured to:
allocate more bandwidth to the slice by assigning at least one additional subinterface to the one or more midlays to which the network slice is assigned.

11. The apparatus as in claim 8, wherein the one or more of midlays to which the network slice is assigned span multiple physical pods of the SDN.

12. The apparatus as in claim 8, wherein the apparatus uses Flexible Ethernet (FlexE) or Time Sensitive Networking (TSN) commands to allocate the fixed amount of bandwidth to each of the subinterfaces.

13. The apparatus as in claim 8, wherein the apparatus forms the plurality of midlays for the SDN by assigning subsets of the plurality of subinterfaces to each of the midlays by:
using virtual routing and forwarding (VRF) to establish routes in the SDN for the midlays.

14. The apparatus as in claim 8, wherein the process when executed is further configured to:
indicating the midlays in a forwarding plane of the SDN using Multiprotocol Label Switching (MPLS) or virtual local area network (VLAN) tagging.

15. A tangible, non-transitory, computer-readable medium storing program instructions that cause a device to execute a process comprising:
configuring, by the device, a plurality of subinterfaces for each of a plurality of physical ports of a software defined network (SDN);
allocating, by the device, a fixed amount of bandwidth to each of the subinterfaces to construct a plurality of midlays for the SDN;
forming, by the device, the plurality of midlays by assigning subsets of the plurality of subinterfaces to each of the midlays, wherein the plurality of midlays operate as an intermediate layer between a physical layer of the SDN and an overlay layer of the SDN to implement network slicing; and
assigning, by the device, a network slice to one or more of the midlays, based on a bandwidth requirement of the network slice.

16. The computer-readable medium as in claim 15, wherein a particular one of the plurality of midlays comprises one or more Fat Trees between one or more leaves of the SDN and a spine of the SDN.

17. The computer-readable medium as in claim 15, wherein the process further comprises:
allocating, by the device, more bandwidth to the slice by assigning at least one additional subinterface to the one or more midlays to which the network slice is assigned.

18. The method as in claim 1, wherein the one or more of midlays to which the network slice is assigned span multiple physical pods of the SDN.

* * * * *

UNITED STATES PATENT AND TRADEMARK OFFICE
CERTIFICATE OF CORRECTION

PATENT NO. : 11,057,301 B2  
APPLICATION NO. : 16/360101  
DATED : July 6, 2021  
INVENTOR(S) : Pascal Thubert et al.

Page 1 of 1

It is certified that error appears in the above-identified patent and that said Letters Patent is hereby corrected as shown below:

In the Specification

Column 2, Line 29, please amend as shown:
the types ranging from local area networks (LANs) to Column 2, Line 67, please amend as shown:
area networks (FANs), neighborhood area networks Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*